US011143855B2

(12) United States Patent
Dixon et al.

(10) Patent No.: US 11,143,855 B2
(45) Date of Patent: Oct. 12, 2021

(54) SCANNING MICROSCOPE USING PULSED ILLUMINATION AND MSIA

(71) Applicants: A. E. Dixon, Waterloo (CA); Savvas Damaskinos, Waterloo (CA); Alfonso Ribes, Waterloo (CA); Jasper Hayes, Waterloo (CA)

(72) Inventors: A. E. Dixon, Waterloo (CA); Savvas Damaskinos, Waterloo (CA); Alfonso Ribes, Waterloo (CA); Jasper Hayes, Waterloo (CA)

(73) Assignee: Huron Technologies International Inc., St. Jacobs (CA)

( * ) Notice: Subject to any disclaimer, the term of this patent is extended or adjusted under 35 U.S.C. 154(b) by 10 days.

(21) Appl. No.: 16/514,158

(22) Filed: Jul. 17, 2019

(65) Prior Publication Data

US 2020/0026051 A1 Jan. 23, 2020

Related U.S. Application Data

(60) Provisional application No. 62/699,448, filed on Jul. 17, 2018.

(51) Int. Cl.
*G02B 21/00* (2006.01)
*H04N 5/235* (2006.01)
*H04N 9/04* (2006.01)

(52) U.S. Cl.
CPC ..... *G02B 21/0084* (2013.01); *G02B 21/0032* (2013.01); *G02B 21/0036* (2013.01); *G02B 21/0076* (2013.01); *H04N 5/2353* (2013.01); *H04N 9/0451* (2018.08); *H04N 9/04551* (2018.08)

(58) Field of Classification Search
CPC ............ G02B 21/0084; G02B 21/0032; G02B 21/0036; G02B 21/0076; H04N 9/0451; H04N 9/04551; H04N 5/2353
See application file for complete search history.

(56) References Cited

U.S. PATENT DOCUMENTS

| 9,575,304 | B2 | 2/2017 | Dixon | |
|---|---|---|---|---|
| 2004/0179190 | A1* | 9/2004 | Miyashita | G03F 7/706 356/124 |
| 2006/0124870 | A1 | 6/2006 | Bobanovic et al. | |
| 2009/0279776 | A1* | 11/2009 | Tirosh | G06T 7/0004 382/149 |
| 2013/0342674 | A1* | 12/2013 | Dixon | G02B 21/36 348/79 |

(Continued)

*Primary Examiner* — Maria E Vazquez Colon
(74) *Attorney, Agent, or Firm* — Bereskin & Parr LLP/S.E.N.C.R.L., s.r.l.

(57) ABSTRACT

According to one aspect, an instrument for scanning a specimen. The instrument includes a scanning stage for supporting the specimen, a detector having a plurality of pixels, the scanning stage and the detector movable relative to each other to move the specimen in a scan direction during a scan, and a pulsed illumination source synchronized with the motion of the specimen on the scanning stage. At least some of the pixels of the detector are operable to collect light emitted from the specimen during the scan due to the pulsed illumination source and generate corresponding image data. The instrument may further include a processor operable to perform MSIA on the image data to generate an image of the specimen.

26 Claims, 14 Drawing Sheets

(56) References Cited

U.S. PATENT DOCUMENTS

| | | |
|---|---|---|
| 2015/0054921 A1 | 2/2015 | Dixon et al. |
| 2016/0004062 A1* | 1/2016 | Dixon ..................... G06T 7/20 348/80 |
| 2016/0377856 A1* | 12/2016 | Mori ..................... H04N 9/07 348/70 |

* cited by examiner

Figure 4a – Simple monochrome tiling
- 8H x 12V pixel array
- Monochrome red light, continuous
- Example of simple tiling
- Two frames shown

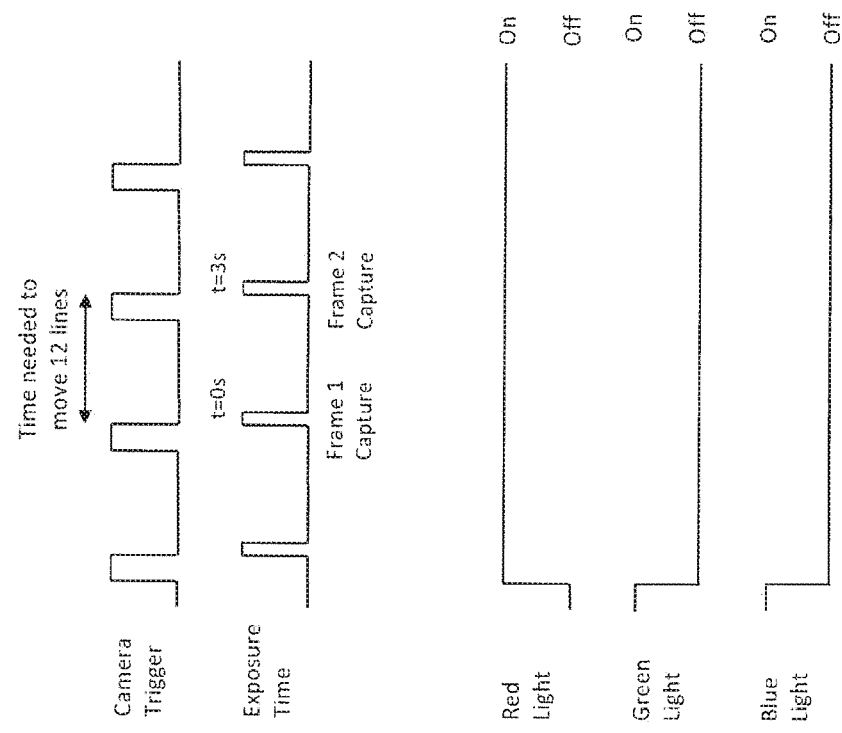
Figure 4b – Timing for simple monochrome tiling

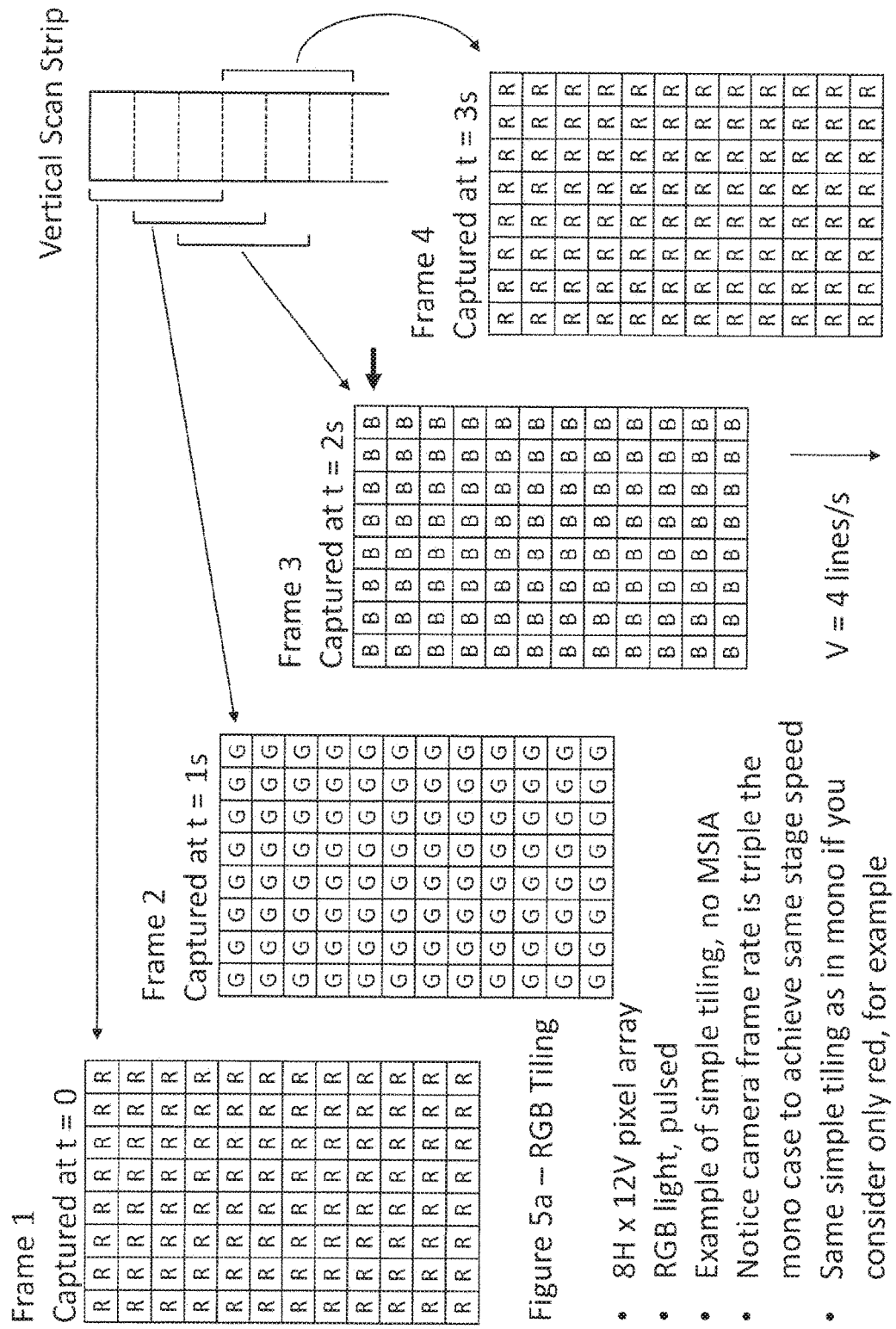

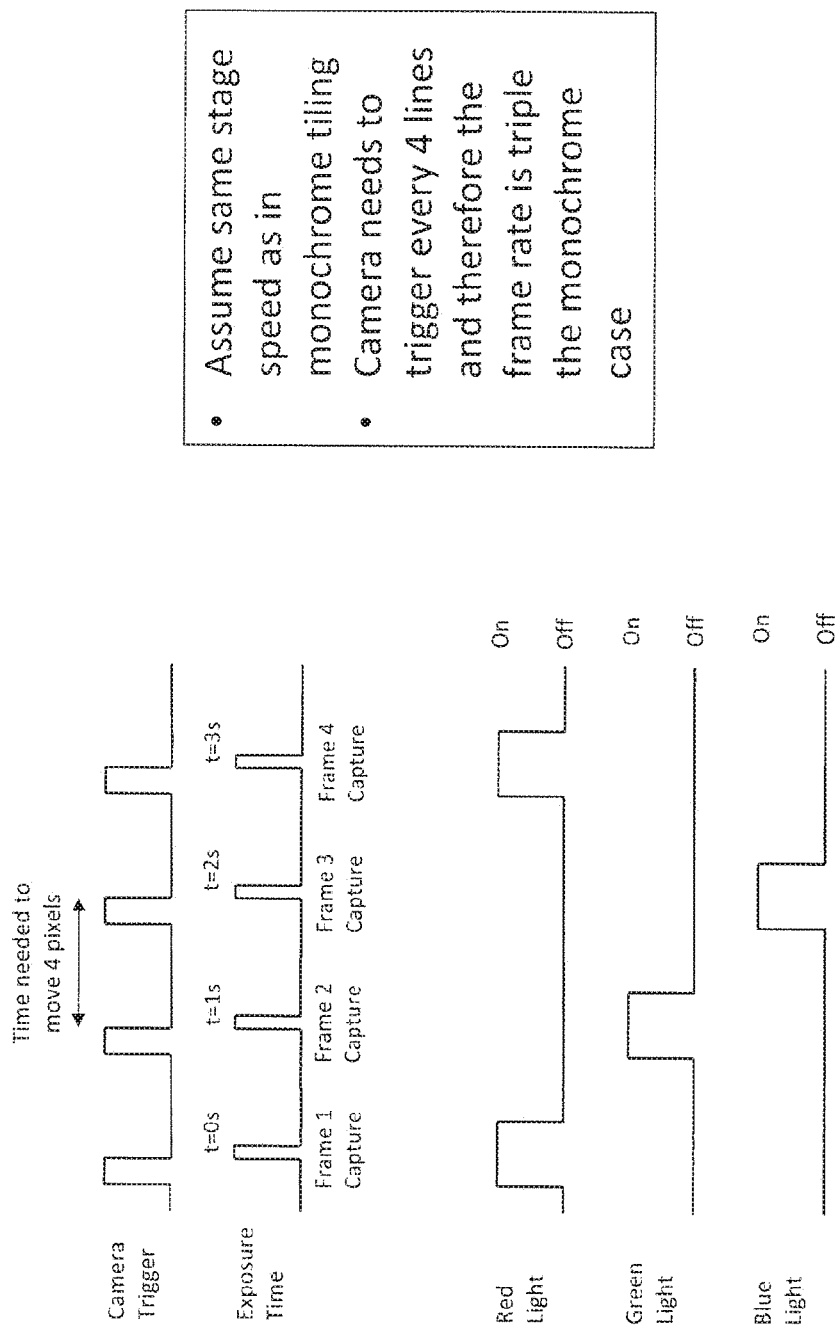
Figure 5b – Timing for simple monochrome tiling

Figure 9 – Camera trigger timing required when stage speed is constant

Figure 10 – Effective exposure time

SCANNING MICROSCOPE USING PULSED ILLUMINATION AND MSIA

CROSS-REFERENCE TO RELATED PATENT APPLICATION

The application claims the benefit of U.S. Provisional Application No. 62/699,448, filed on Jul. 17, 2018. The complete disclosure of U.S. Provisional Application No. 62/699,448 is incorporated herein by reference.

TECHNICAL FIELD

Embodiments herein relate to the fields of scanning imaging of large specimens, with particular emphasis on scanning microscopy imaging that includes brightfield imaging, as well as fluorescence and spectrally-resolved imaging. In some cases, applications may include imaging tissue specimens and other pathology slides, genetic microarrays, protein arrays, tissue arrays, cells and cell populations, biochips, arrays of biomolecules, fluorescent nanoparticles, semiconductor materials and devices, and many others.

INTRODUCTION

Several technologies are used for 2D imaging of large specimens at high resolution. With tiling microscopes, the image of a small area of the specimen is recorded with a digital camera (usually a CCD or CMOS camera), the specimen is moved with a computer-controlled microscope stage to image an adjacent area, an image of the adjacent area is recorded, the stage is moved again to the next area, and so on until a number of image tiles have been recorded that together cover the whole area of the specimen. Images of each area (image tiles) are recorded when the stage is stationary, after waiting long enough for vibrations from the moving stage to dissipate. When used for brightfield imaging, the specimen is typically illuminated from below using a white-light source, and an RGB camera (typically using a Bayer filter) is used to collect each image tile. After demosaicing, these image tiles can be butted together, or overlapped and stitched using computer stitching algorithms, to form a color image of the entire specimen. Stitching tiles together is complicated by distortion and curvature of field of the microscope objective, which occur near the edges of the field of view (just where stitching of tiles occurs).

When tiling microscopes are used for fluorescence imaging, the specimen is typically illuminated from above (epi-illumination) using an illumination wavelength (or range of wavelengths) chosen to excite a particular fluorophore in the specimen. While the microscope stage is stationary, fluorescence emitted from the specimen passes through an emission filter that passes the emission band from that fluorophore, and is focused on a digital camera. The exposure time can be adjusted to match the intensity of fluorescence from the specimen. The areas surrounding each tile and the overlapping edges of adjacent tiles can be exposed twice (and the corners four times), which can bleach some fluorophores. Exposure is typically adjusted by changing the exposure time for each tile. If multiple fluorophores are imaged, different exposure time, illumination wavelength and emission filter are required for each fluorophore, so each fluorophore requires a separate image at each tile position. Multiple exposure of the specimen for imaging multiple fluorophores can also increase bleaching. After all tiles have been collected, considerable effort (human or computer, or both) may be required to stitch the tiles together and correct each tile for illumination intensity and collection sensitivity changes across the field of view of the microscope (correction for variations in illumination intensity and collection sensitivity is sometimes called "field flattening"). Some strip-scanning instruments are also used for imaging large specimens. In these instruments, infinity-corrected microscope optics are used, with a high Numerical Aperture (NA) microscope objective and a tube lens of the appropriate focal length to focus an image of the specimen directly on a CCD or CMOS linear array sensor, or TDI sensor, with the correct magnification to match the resolution of the microscope objective with the detector pixel size for maximum magnification in the digitized image {as described for example in "Choosing Objective Lenses: The Importance of Numerical Aperture and Magnification in Digital Optical Microscopy", David W. Piston, Biol. Bull. 195, 1-4 (1998)}.

A linear CCD detector array with 1000 or 2000 pixels is often used, and three separate linear detectors with appropriate filters to pass red, green and blue light are used for RGB brightfield imaging. The sample may be moved at constant speed in the direction perpendicular to the long dimension of the linear detector array to scan a narrow strip across a microscope slide. The entire slide can be imaged by imaging repeated strips and butting them together to create the final image.

Another version of this technology uses TDI (Time Delay and Integration) array sensors which increase both sensitivity and imaging speed. In both of these instruments, exposure is varied by changing illumination intensity and/or scan speed.

An example of such a microscope is shown in FIG. 1. A tissue specimen 100 (or other specimen to be imaged) mounted on microscope slide 101 is illuminated from below by illumination source 110. In some cases, the tissue specimen 100 may be a biological specimen, which is commonly covered with a transparent cover slip (not shown). Light passing through the specimen is collected by an infinity-corrected microscope objective 115 that is focused on the specimen by a motorized positioner 120. The microscope objective 115 and tube lens 125 form a real image of the specimen on a linear detector array 130. An image of the specimen is collected by moving the microscope slide at constant speed using motorized stage 105 in a direction perpendicular to the long dimension of the detector array 130, combining a sequence of equally-spaced line images from the array to construct an image of one strip across the specimen. Strips can then be assembled to form a complete image of the specimen.

For brightfield imaging, most strip-scanning instruments illuminate the specimen from below, and detect the image in transmission using a sensor placed above the specimen. In brightfield, signal strength is high, and red, green and blue channels are often detected simultaneously with separate linear detector arrays to produce a color image.

Compared to brightfield imaging, fluorescence signals can be thousands of times weaker, and notably some fluorophores have much weaker emission than others. Fluorescence microscopy is usually performed using illumination from the same side as detection (i.e., epi-illumination) so that the bright illumination light passing through the specimen does not enter the detector.

In strip-scanning instruments, exposure is varied by changing scan speed, so previously known strip-scanning instruments would scan each fluorophore separately, reducing the scan speed when greater exposure is required for a weaker fluorophore. Since exposure is adjusted by changing scan speed, it is difficult to design a strip-scanner for simultaneous imaging of multiple fluorophores, where each channel would have the same exposure time, and existing strip-scanners typically scan one fluorophore at-a-time.

Furthermore, in fluorescence microscopy, relative intensity measurements are sometimes important for quantitative measurement, and 12 or 16 bit dynamic range may be required. For existing strip scanners, this would require larger dynamic range detectors and slower scan speeds.

Before scanning a large specimen in fluorescence, it is normally important to set the exposure time (in a tiling or strip-scanning microscope) or the combination of laser intensity, detector gain and scan speed (in a scanning laser macroscope or microscope) so that the final image will be properly exposed. More particularly, the final image in general should not contain saturated pixels, but the gain should be high enough that the full dynamic range will be used for detecting each fluorophore in the final image. Two problems have been identified when trying to achieve this result—the exposure must be estimated in advance for each fluorophore, and for simultaneous detection of multiple fluorophores the exposure time must be estimated and scan speed set before scanning.

For strip-scanning instruments, estimating the exposure in advance is difficult without scanning the whole specimen first to check exposure, and this must be done for each fluorophore. Instead of scanning first to set exposure, many operators simply set the scan speed to underexpose slightly, resulting in noisy images, or possibly images with some overexposed (saturated) areas if the estimated exposure was not correct. In some known scanners, a high-speed preview scan can be used to set detection gain in each channel before final simultaneous imaging of multiple fluorophores (see U.S. Pat. No. 8,655,043, "Imaging System with Dynamic Range Maximization"), however this can be cumbersome and generally requires additional steps.

An example of a scanning microscope for fluorescence imaging using a TDI detector array is shown in FIG. 2. A tissue specimen 201 (or other specimen to be imaged) is mounted on a microscope slide 101 and is illuminated from above by illumination source 200. In fluorescence imaging, the illumination source is usually mounted above the specimen (epi-fluorescence) so that the intense illumination light that passes through the specimen is not mixed with the weaker fluorescence emission from the specimen, as it would be if the illumination source were below the specimen.

Several different optical combinations can be used for epi-fluorescence illumination—including illumination light that is injected into the microscope path between the microscope objective and the tube lens, using a dichroic beamsplitter to reflect it down through the microscope objective and onto the specimen. In addition, a narrow wavelength band for the illumination light may typically be chosen to match the absorption peak of the fluorophore in use. Fluorescence emitted by the specimen is collected by infinity-corrected microscope objective 115, which is focused on the specimen by motorized positioner 120.

An emission filter 205 is chosen to reject light at the illumination wavelength, and to pass the emission band of the fluorophore in use. The microscope objective 115 and tube lens 125 form a real image of the specimen on TDI detector array 210.

An image of the specimen is collected by moving the microscope slide using motorized stage 105 in a direction perpendicular to the long dimension of the detector array 210, combining a sequence of equally-spaced, time-integrated line images from the array to construct an image of one strip across the specimen. Strips are then assembled to form a complete image of the specimen.

When a CCD-based TDI array is used, each line image stored in memory is the result of integrating the charge generated in all of the previous lines of the array while the scan proceeds, and thus has both increased signal/noise and amplitude (due to increased exposure time) when compared to the result from a linear array detector. Exposure is typically adjusted by changing the scan speed, so the scan time (and thus image acquisition time) is increased by reducing the scan speed when using weak fluorophores. It is difficult to predict the best exposure time before scanning.

When multiple fluorophores are used on the same specimen, the usual imaging method is to choose illumination wavelengths to match one fluorophore, select the appropriate emission filter and scan time (speed) for the chosen fluorophore, and scan one strip in the image. Then the illumination wavelength band is adjusted to match the absorption band of the second fluorophore, a matching emission filter and scan speed are chosen, and that strip is scanned again. Additional fluorophores normally require the same steps to be repeated. Finally, this is repeated for all strips in the final image.

Some instruments use multiple TDI detector arrays to expose and scan multiple fluorophores simultaneously, but this usually results in a final image where one fluorophore is exposed correctly and the others are either under- or overexposed. Exposure can be adjusted by changing the relative intensity of the excitation illumination for each fluorophore, which should be easy to do if LED illumination is used.

When multiple illumination bands are used at the same time, the resulting image for each fluorophore may differ from that produced when only one illumination band is used at a time because of overlap of the multiple fluorophore excitation and emission bands, and because autofluorescence from the tissue itself may be excited by one of the illumination bands. Autofluorescence emission usually covers a wide spectrum and may cause a bright background in all of the images when multiple fluorophores are illuminated and imaged simultaneously.

A description of some strip scanning instruments, using either linear arrays or TDI arrays, is given in U.S. Pat. No. 6,711,283B1 ("Fully Automatic Rapid Microscope Slide Scanner", by Dirk Soenksen).

Linear arrays work well for brightfield imaging, but the user is often required to perform a focus measurement at several places on the specimen before scanning. Alternatively, a separate detector may be used for automatic focus. Linear arrays are not often used for fluorescence imaging because exposure time is inversely proportional to scan speed, which makes the scan time very long for weak fluorophores. In addition, exposure (scan speed) must be adjusted for each fluorophore, making simultaneous measurement of multiple fluorophores difficult when they have widely different fluorescence intensity (which is quite common).

TDI arrays and associated electronics are expensive, but the on-chip integration of several exposures of the same line on the specimen provides the increased exposure time required for fluorescence imaging while maintaining a reasonable scan speed. Simultaneous imaging of multiple fluorophores using multiple TDI detector arrays is still very difficult, however, since each of the detectors has the same integration time (set by the scan speed). It is therefore common to use only one TDI array, adjusting exposure for each fluorophore by changing the scan speed and collecting a separate image for each fluorophore. Focus is set before scanning at several positions on the specimen, or automatic focus is achieved using a separate detector or focus measuring device.

These scanners require dynamic focus while scanning, with focus adjustment directed by pre-scan focus measurements at several positions along each image strip, or by using a separate focus detector.

Definitions

For the purposes of this document, a "macroscopic specimen" (or "large microscope specimen") is generally defined as one that is larger than the field of view of a compound optical microscope, such as a compound optical microscope containing a microscope objective that has the same Numerical Aperture (NA) as that of the scanner described in this document.

For the purposes of this document, "TDI" or "Time Delay and Integration" is generally defined as a method and detectors used for scanning moving objects, usually including a CCD-based detector array in which charge is transferred from one row of pixels in the detector array to the next in synchronism with the motion of the real image of the moving object. As the object (and its image) moves, charge builds up and the result is charge integration just as if a longer exposure were used in a stationary imaging situation. When the image (and integrated charge) reaches the last row of the array, that line of pixels is read out. One example of such a camera is the DALSA Piranha TDI camera. CMOS TDI imagers have also been developed. CCD TDI imagers combine signal charges, while CMOS TDI imagers combine voltage signals. For the purposes of this document, TDI imagers are defined as linescan detectors (not area detectors).

For the purposes of this document the term "image acquisition" generally includes the steps necessary to acquire and produce a final image of the specimen, which may include some of (but are not necessarily limited to) the following: the steps of preview scanning, instrument focus, predicting and setting gain for imaging each fluorophore, image adjustments including demosaicing (where required), scan linearity adjustment, field flattening (compensating for fluorescence intensity variation caused by excitation intensity and detection sensitivity changes across the field of view), dark frame subtraction, correction of frame images for geometric distortion, correction of fluorescence signal in one channel caused by overlap of fluorescence from adjacent (in wavelength) channels when two or more fluorophores are excited simultaneously, dynamic range adjustment, butting or stitching together adjacent image strips (when necessary), storing, transmitting, assembling and viewing the final image.

For the purposes of this document, a "frame grabber" generally includes any electronic device that captures individual, digital still frames from an analog video signal or a digital video stream or digital camera. It is often employed as a component of a computer vision system, in which video frames are captured in digital form and then displayed, stored or transmitted in raw or compressed digital form. This definition may include direct camera connections via USB, Ethernet, IEEE 1394 ("FireWire"), Camera link, CoaXpress, and other interfaces that are now practical.

For the purposes of this document, Moving Specimen Image Averaging ("MSIA") is generally defined as the method and technology for acquiring digital strip images (i.e., image strips) across a large microscope specimen or other specimen by capturing sequential overlapping frame images of a moving specimen, typically where a new image frame is captured each time the specimen has moved a distance that causes the image of that specimen projected by the optics onto a two-dimensional detector array to move a distance equal to the distance between a small number of rows of detectors in the detector array (where this number is normally held constant while scanning digital image strips, and is usually equal to 1), image data from the new frame is translated (moved) in computer memory to match the motion of the optical image across the detector array, and is added to (or in some cases may be averaged with) the data previously stored to generate an image of a strip across the specimen. In some cases, such a procedure may be continued until the specimen has moved a distance such that all object points in that strip have been exposed a number of times equal to the number of active rows in the detector array (usually chosen by defining a "detector area of interest" or "detector active area" that has the width of the detector but a smaller number of rows than the detector array contains) divided by the smaller number of rows moved between each successive image capture. All pixels in the resulting image strip tend to have increased signal-to-noise ratio (S/N) because of pixel averaging, where the increased signal-to-noise ratio is equal to the square root of the number of times each pixel has been averaged to produce the final MSIA strip image, and increased dynamic range because of pixel addition and the reduction of noise caused by averaging (especially in the dark pixels).

As used herein, the terms "frame image" and "image frame" are identical to one another and are used interchangeably.

As used herein, "Fluorescence" generally includes fluorescence from naturally-occurring sources inside the specimen and fluorescent dyes and markers (including for example quantum dots) that may be added to the specimen, as well as fluorescence from the substrate or a layer above the specimen.

As used herein, "Spectral imaging" generally refers to the method and technology for acquiring images in which each pixel is represented by its spectrum.

As used herein, "Hyperspectral imaging" generally refers to the method and technology for acquiring images in which each pixel is represented by a spectrum composed of narrow spectral bands over a continuous spectral range.

As used herein, "Imaging spectroscopy" generally refers to the acquisition and processing of hyperspectral images.

As used herein, "Multispectral imaging" generally refers to the method and technology for acquiring multiple images of an object, each image representing a range of wavelengths. For example, each image could represent the emission range (or part of the emission range) of a particular fluorophore. In this case each pixel in the final multispectral image may not contain a spectrum of the fluorescence emitted by the specimen at that position, but contains information about the signal detected from each fluorophore at that pixel position.

For the purposes of this document, a "mosaic scan filter array" is generally defined as a mosaic filter array that is designed for high resolution imaging using MSIA scanning, typically comprised of rows of tiles where tiles in every row are displaced one pixel position to the right (or tiles in all rows are displaced one pixel position to the left) in the direction perpendicular to the scan direction, where the resulting image typically contains full color information at each pixel position and typically without requiring demosaicing or interpolation. For clarity, an RGGB Bayer Filter is not a "mosaic scan filter array" as described here because the rows of square RGGB tiles are not displaced one pixel position from one row of tiles to the next, and when used for scanning, interpolation between adjacent rows of pixel data is required to estimate the R and B intensities in every second row of R and B pixel data.

As used herein, a "scan color filter array" is generally defined as a color filter array comprised of rows of different color filters, where each row contains a single color, that has been designed for MSIA scanning such that when used in MSIA scanning every pixel position in the final image may contain full color information, typically with no interpolation required.

As used herein, the "scan plane" is generally defined as a plane in which the specimen moves during scanning. When the specimen is mounted on a microscope slide, the scan plane is typically parallel to the surface of the microscope slide.

SUMMARY OF VARIOUS EMBODIMENTS

One or more embodiments as described herein may provide a scanning instrument and method of brightfield imaging whereby a monochrome (greyscale) area detector array is used with a pulsed illumination source providing sequential R, G and B illumination where the pulsing of the illumination source is synchronized with the motion of a specimen on a computer-controlled scanning stage. Exemplary methods for some embodiments are described in FIGS. 5a, 5b, and 6, while exemplary instrumentation itself is described in FIG. 3.

One or more embodiments as described herein may provide a scanning instrument and method of brightfield imaging using MSIA whereby a monochrome (greyscale) area detector array is used with a pulsed illumination source providing sequential R, G and B illumination where the pulsing of the illumination source is synchronized with the motion of a specimen on a computer-controlled scanning stage. Exemplary methods for said embodiments are described in FIGS. 7, 8, and 9, while exemplary instrumentation itself is described in FIG. 3.

One or more embodiments as described herein may provide a scanning instrument and method of brightfield imaging using MSIA whereby a color area detector array may be used with a pulsed white-light illumination source providing illumination, where the pulsing of the illumination source is synchronized with the motion of a specimen on a computer-controlled scanning stage, and where the color area detector array incorporates one of an RGGB Bayer filter, a mosaic scan filter array, or a scan color filter array.

One or more embodiments as described herein may provide a scanning instrument and method of brightfield imaging using MSIA whereby a color area detector array is used with a pulsed illumination source providing illumination, where the pulsing of the illumination source is synchronized with the motion of a specimen on a computer-controlled scanning stage, and where the color area detector array incorporates one of a mosaic scan filter array or a scan color filter array, and the colors in the filter array are chosen to transmit spectrally-resolved light such that the final image is a spectrally-resolved or multispectral image of the specimen. This is described by FIG. 11 according to one exemplary embodiment.

One or more embodiments as described herein may provide a scanning instrument and method of fluorescence imaging whereby a monochrome (greyscale) area detector array is used with a pulsed illumination source providing fluorescence excitation illumination, where the pulsing of the source is synchronized with the motion of a specimen on a computer-controlled scanning stage. Exemplary instrumentation for such an embodiment is described generally in FIG. 3.

One or more embodiments as described herein may provide a scanning instrument and method of fluorescence imaging using MSIA whereby a monochrome (greyscale) area detector array is used with a pulsed illumination source providing fluorescence excitation illumination, where the pulsing of the source is synchronized with the motion of a specimen on a computer-controlled scanning stage. Exemplary instrumentation for such an embodiment is described generally in FIG. 12.

One or more embodiments as described herein may provide a scanning instrument in which the exposure time for each image frame is set using the camera's internal or external shutter, or by the pulse width of the illuminating source. An exemplary method of such an approach is described by FIG. 10.

BRIEF DESCRIPTION OF THE DIAGRAMS

FIG. 4b shows the camera trigger pulses and the exposure time for each image frame when a monochrome continuous red light source is used with the slide scanner of FIG. 3.

FIG. 5a shows the capture of R, G and B frame images when the brightfield scanner of FIG. 3 is used with sequential exposure of overlapping R, G and B frame images in a single scan.

FIG. 5b shows the camera trigger pulses, the exposure time and the on time for each of the three illumination colors to generate overlapping single color image frames in a single scan.

Figure 6:
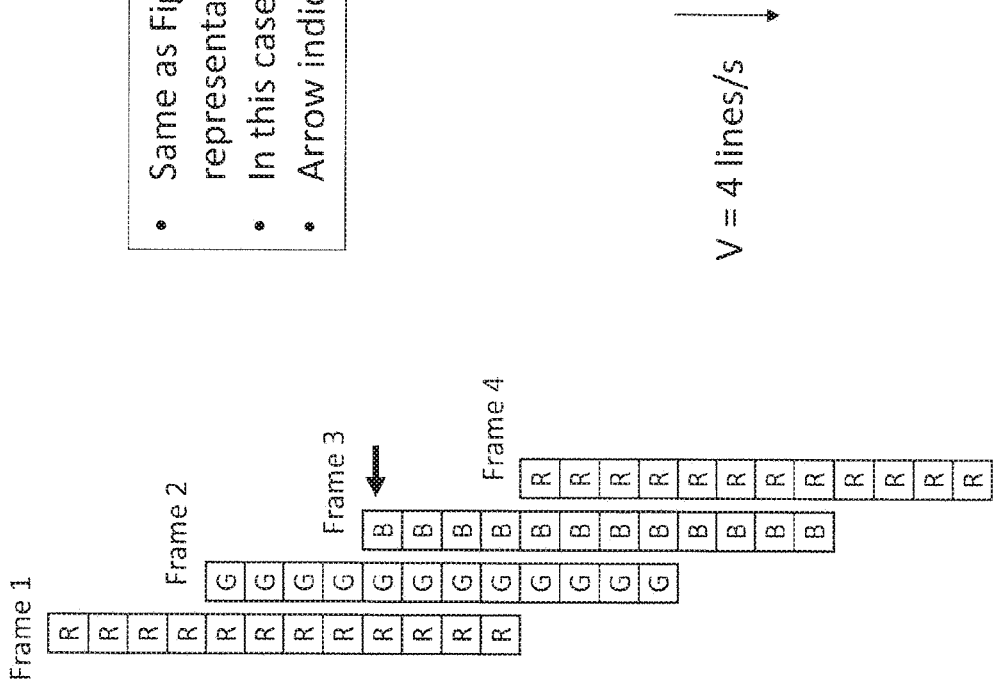
FIG. 6 represents the same information as shown in FIG. 5a, but where each frame image is represented by a single column of squares to reduce the size of the diagram.
Figure 7:
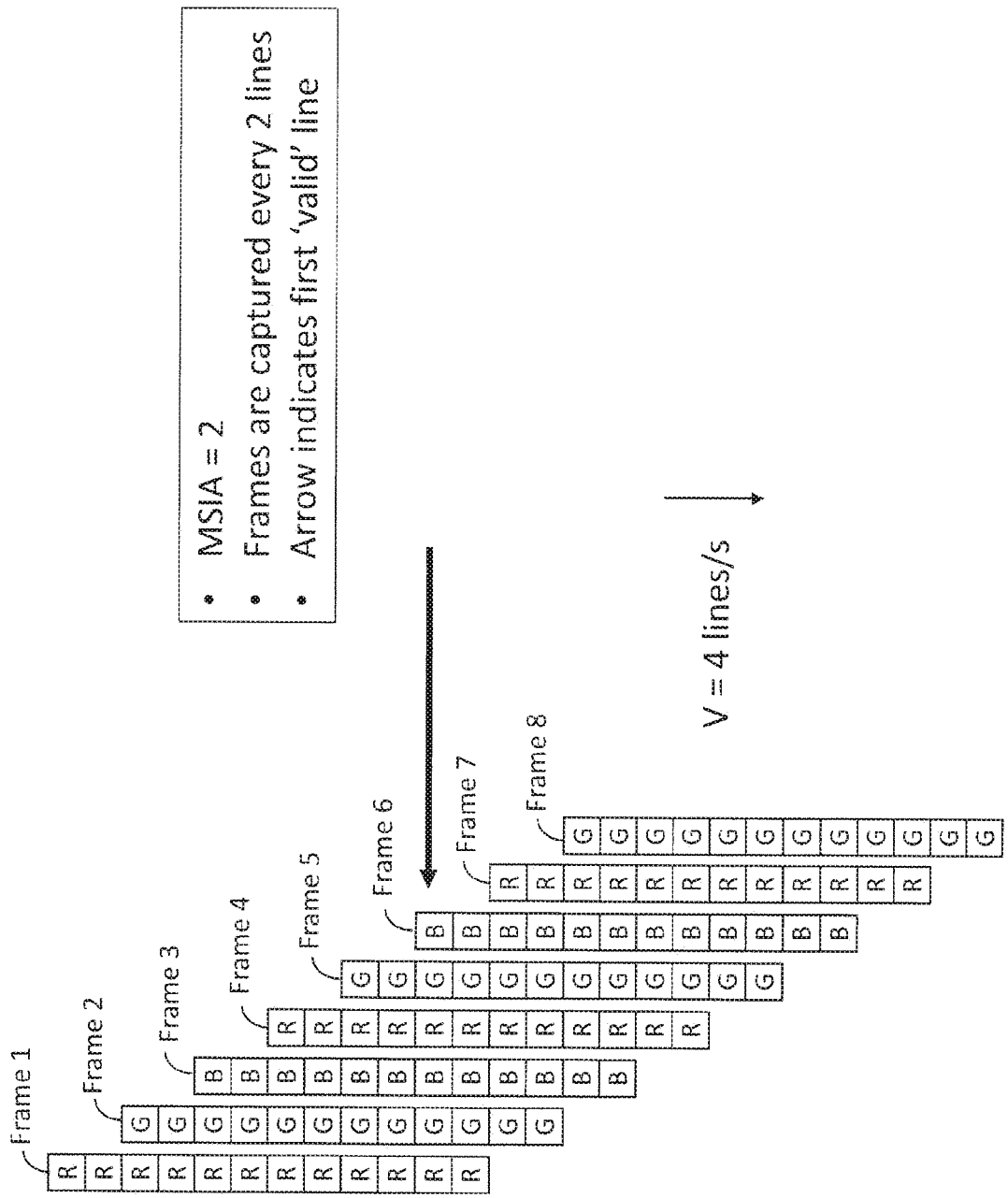

FIG. 7 generally uses the same frame image representation as in FIG. 6, but where image frames are captured at twice the rate to enable MSIA imaging where each color at each pixel position is exposed twice and the pixel data are averaged (MSIA=2).

Figure 8:
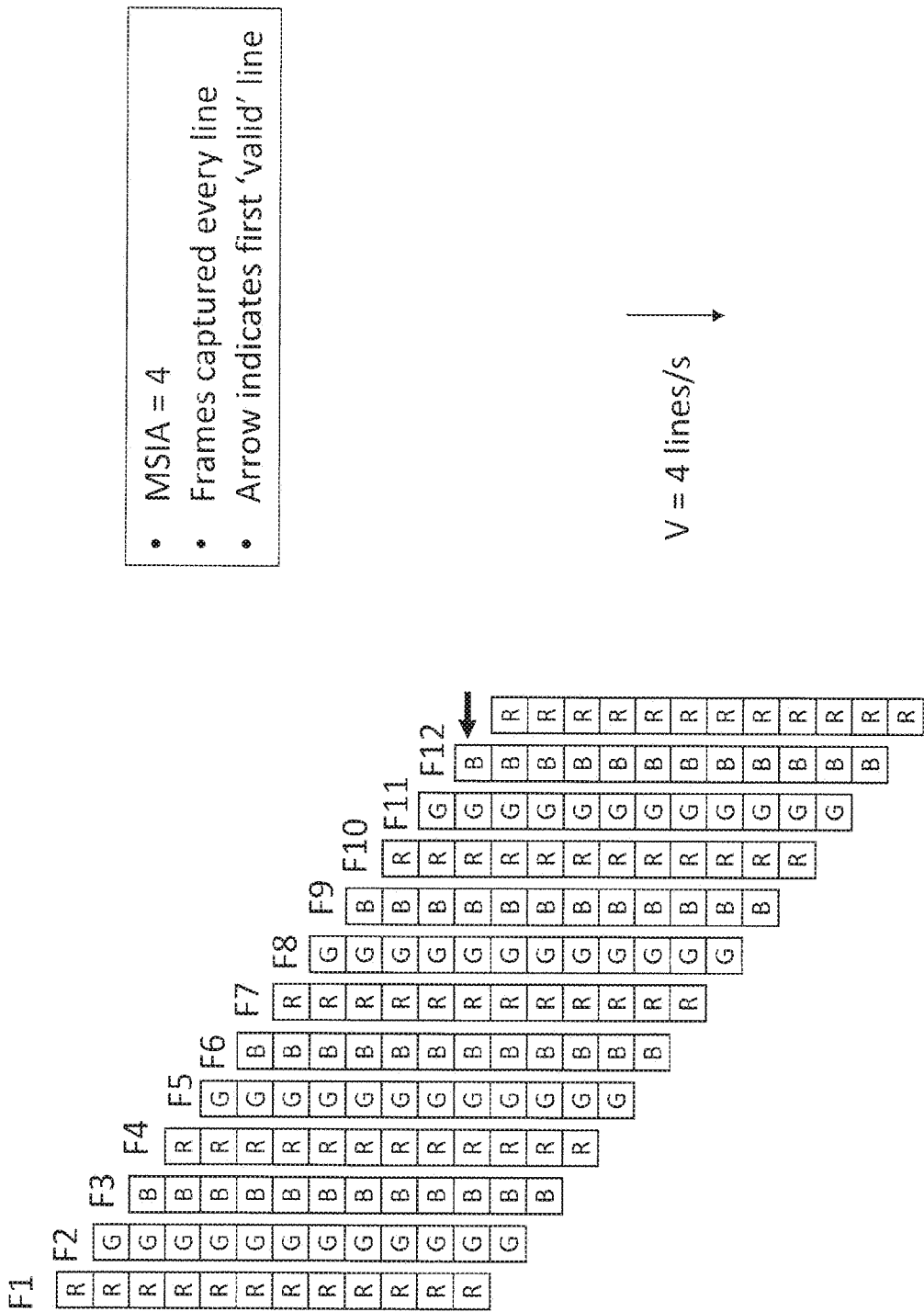

FIG. 8 shows MSIA imaging with a 12-line active area of the sensor in which a frame image is captured every time the image of the specimen projected onto the sensor moves a distance equal to the distance between pixels in the sensor array. Here each color at each pixel position is exposed four times, resulting in an MSIA=4 image when the pixel data are averaged.

Figure 9:
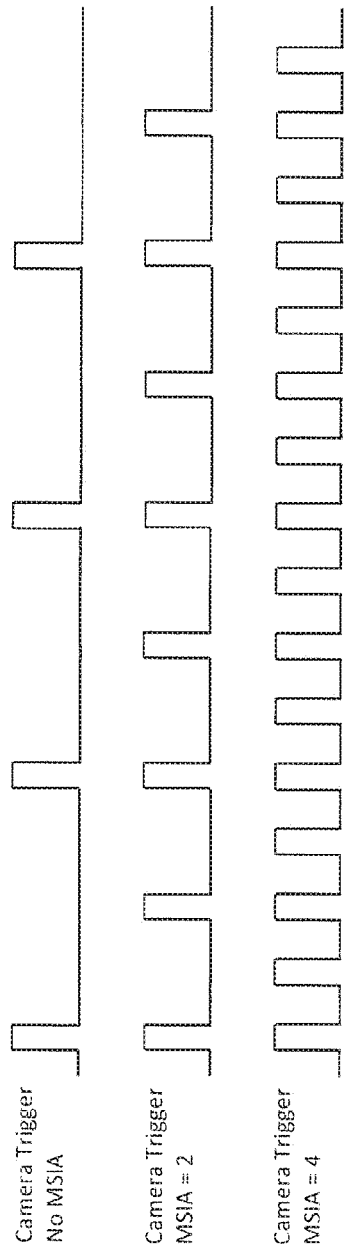

FIG. 9 shows the timing for the trigger signal for the camera shutter for monochrome tiling as described earlier in FIG. 4b, but here with the addition of MSIA.

Figure 10:
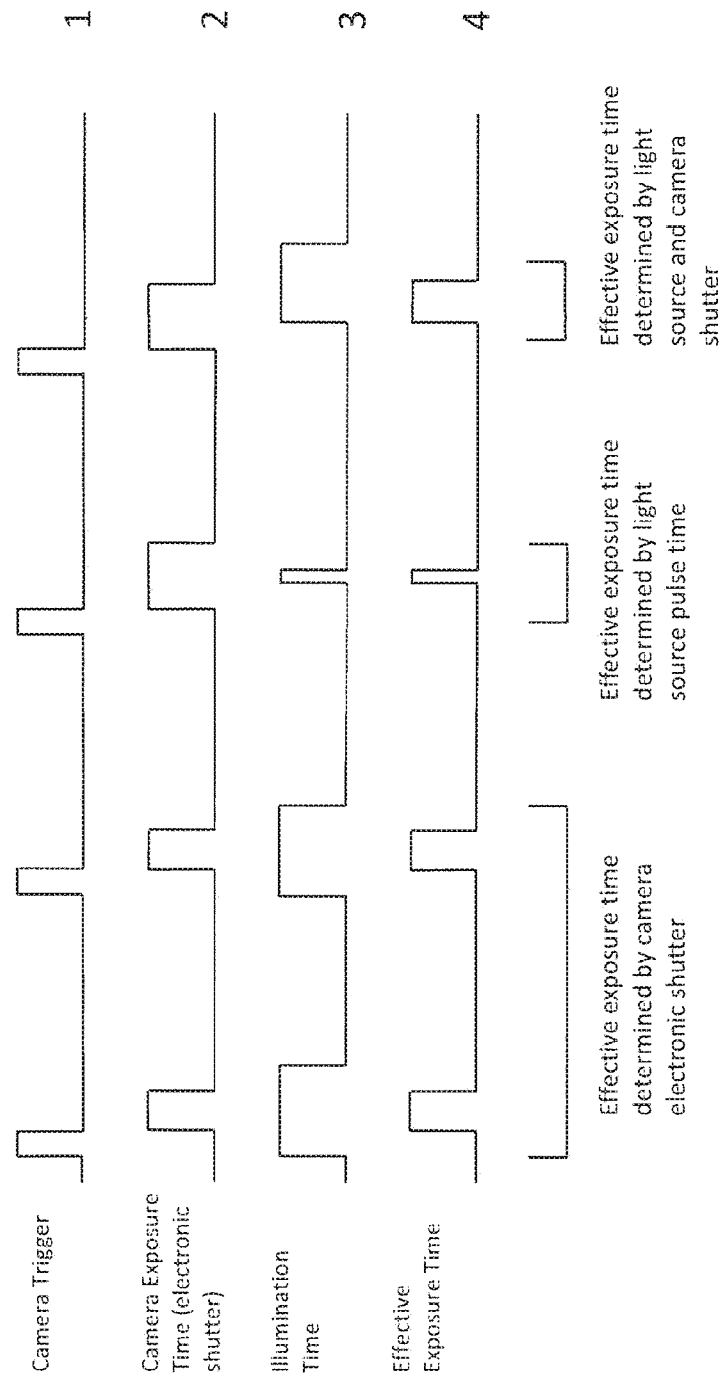

FIG. 10 shows several examples of how the exposure for a frame image can be controlled.

Figure 11:
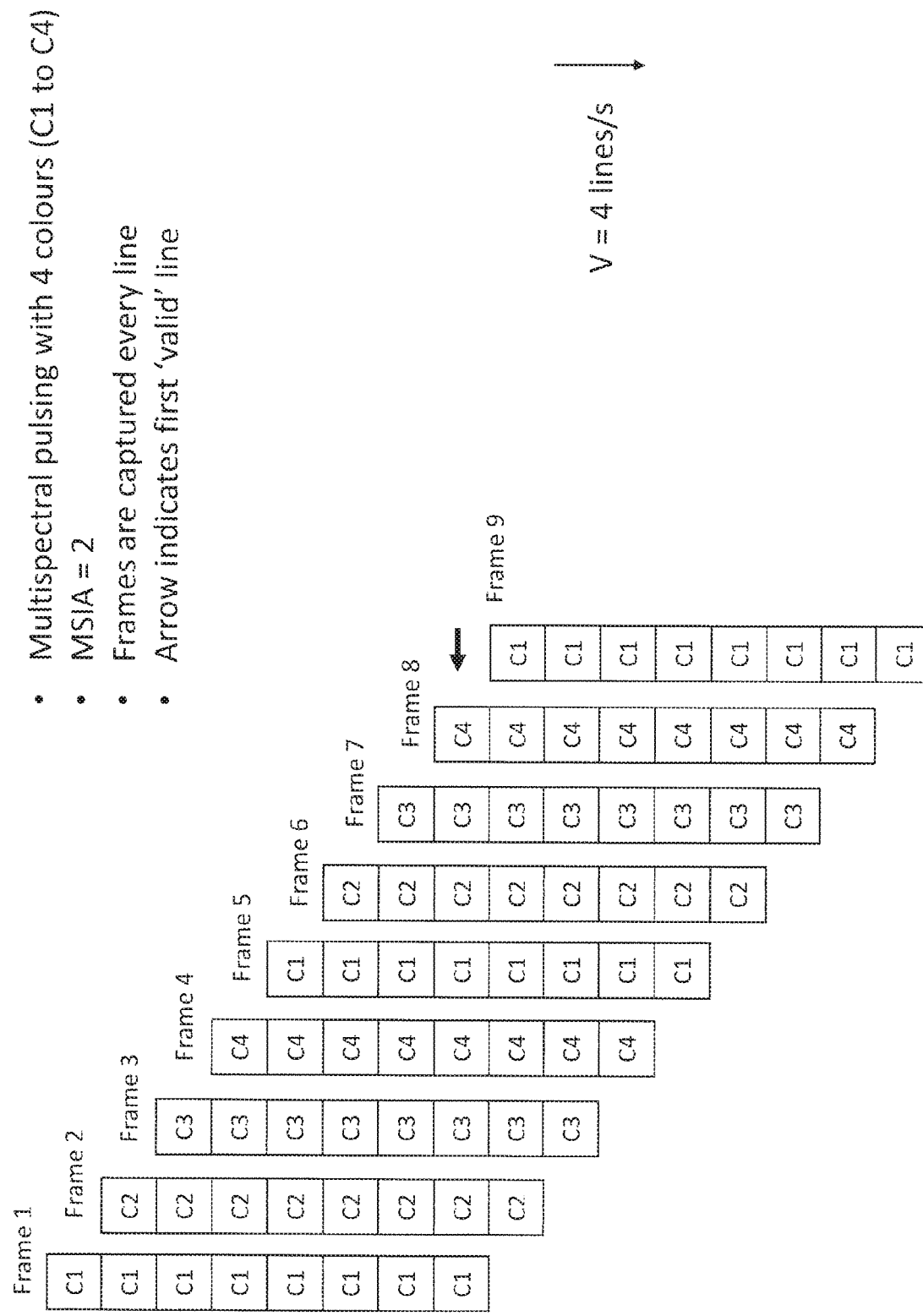

FIG. 11 illustrates how pulsed illumination using four colors of illumination can be used to acquire a multispectral strip image in a single scan.

Figure 12:
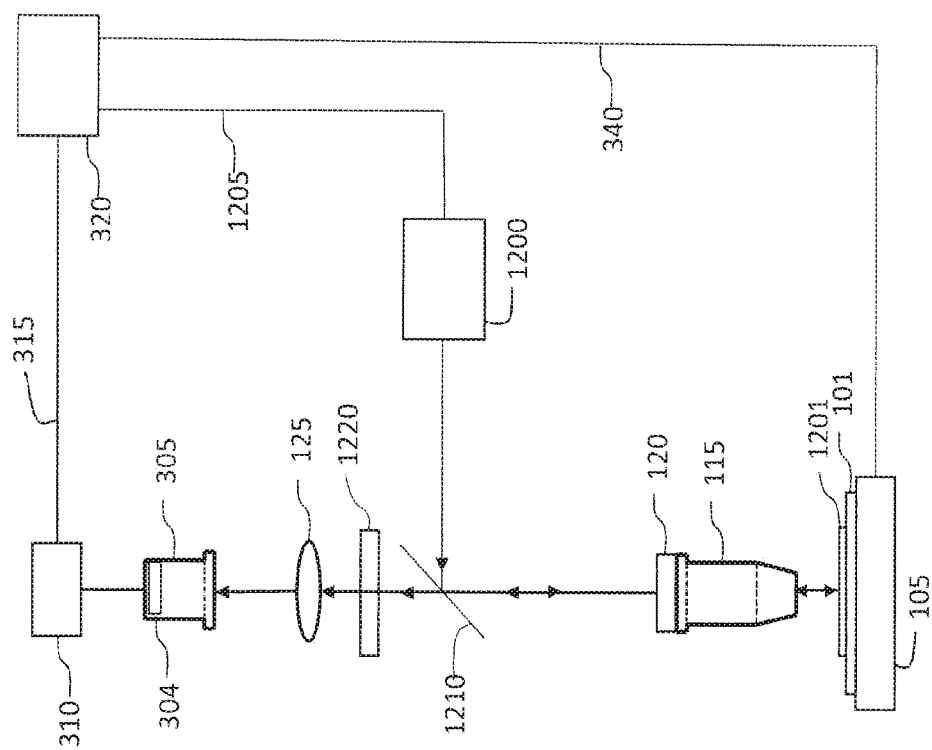

FIG. 12 is a schematic view of a fluorescence or photoluminescence microscope slide scanner using a pulsed light source for epi-illumination that is synchronized with the motion of the scanning stage.

DESCRIPTION OF VARIOUS EMBODIMENTS

Figure 1:
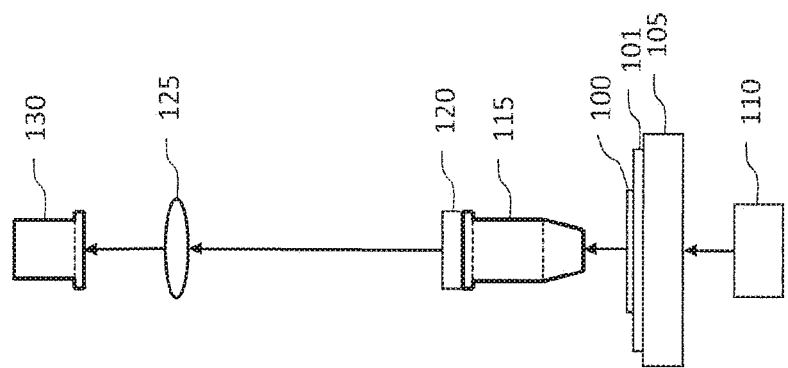
FIG. 1 is a schematic view of a brightfield microscope slide scanner using an area detector array (a tiling microscope scanner).
Figure 2:
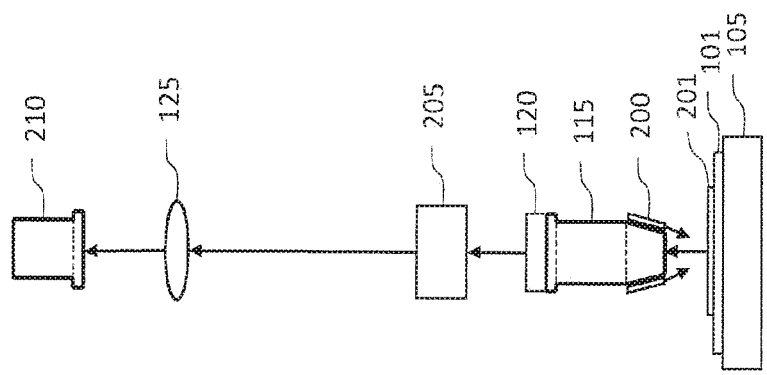
FIG. 2 is a schematic view of a fluorescence microscope slide scanner using a TDI detector array.
Figure 3:
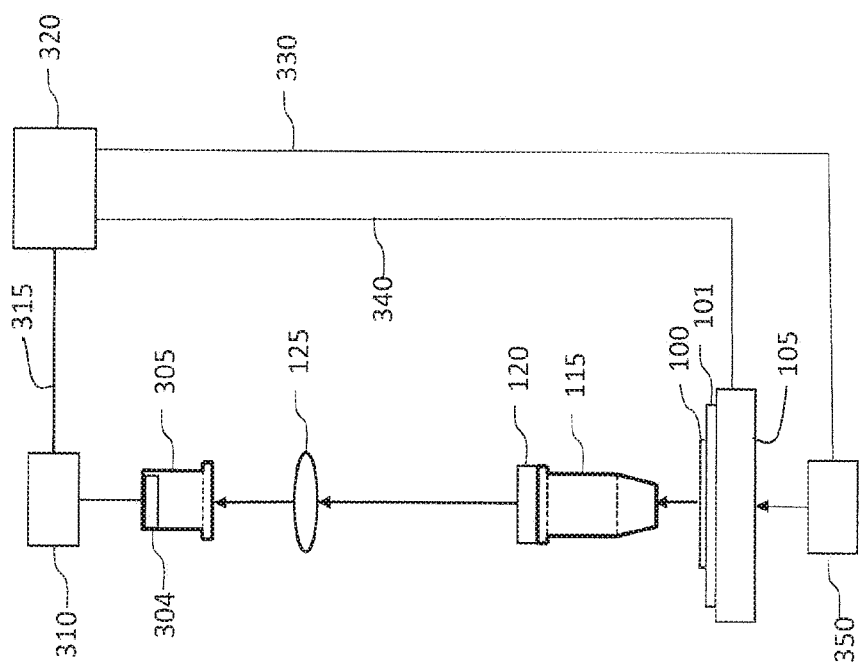
FIG. 3 is a schematic view of a brightfield microscope slide scanner using a pulsed light source that is synchronized with the motion of the scanning stage.

Turning now to FIG. 3, illustrated therein is a schematic view of a scanning brightfield microscope with computer-controlled stage and light source. A tissue specimen 100 (or other specimen to be imaged) mounted on microscope slide 101 is illuminated from below by illumination source 350, where the color, intensity and on-time of the illumination source is controlled by computer 320 through connection 330 (or other communication mechanism such as Wi-Fi or Bluetooth).

In some cases, the tissue specimen 100 may be a biological specimen, which is commonly covered with a transparent cover slip (not shown).

Light passing through the specimen is collected by infinity-corrected microscope objective 115 which is focused on the specimen by motorized positioner 120. The microscope objective 115 and tube lens 125 form a real image of the specimen on a monochrome area detector array 304, inside camera 305.

An image of the specimen is collected by moving the microscope slide at constant speed using motorized stage 105 (controlled by computer 320) through connection 340 (or other communication mechanism including Wi-Fi or Bluetooth) in a direction perpendicular to the rows of detector pixels of the monochrome detector array 304 in camera 305.

The shutter in camera 305 (which may be part of detector array 304) is actuated by frame grabber 310, which is controlled by computer 320 through connection 315 (or other communication mechanism). The shutter is open for only a short time for each exposure, for example for the time it takes for the image projected onto the detector array by tube lens 125 to move a distance across the detector array that is less than or equal to half the distance between adjacent rows in the array.

Figure 4A:
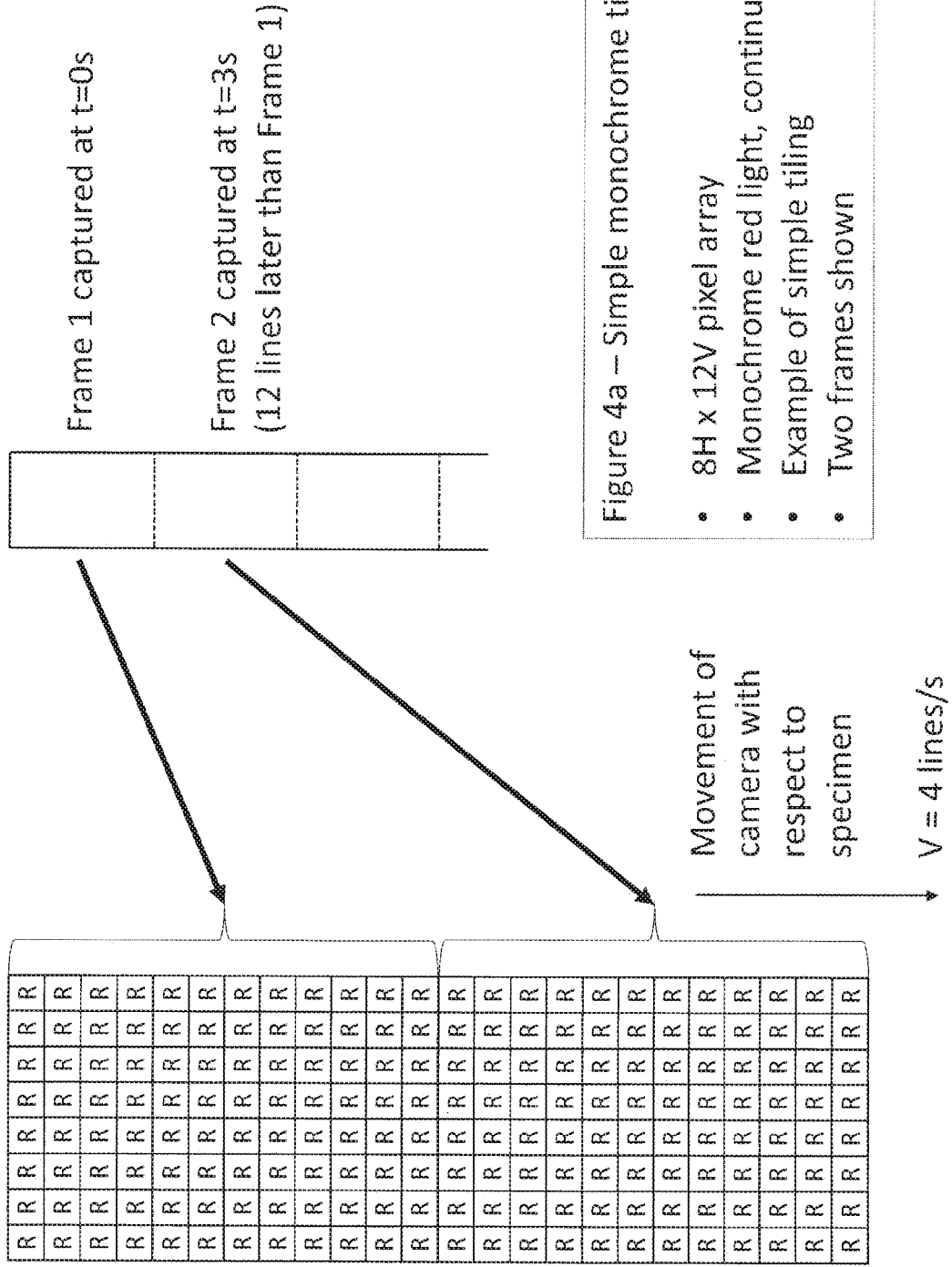
FIG. 4a shows an assembly of scan strip images when the brightfield slide scanner of FIG. 3 is used with a monochrome light source to acquire full frame monochrome images.

Computer 320 combines a sequence of contiguous area images from the array to construct an image of one strip across the specimen, as shown in FIG. 4a. Strips are then assembled to form a complete image of the specimen. Note that in some embodiments the frame grabber can sometimes be effectively absorbed into the computer or camera, such as in a GigE camera (these are commonly refer to as frame grabberless systems).

Turning now to FIG. 4a, this image shows how the sequence of frame images from the camera are combined in computer 320 to assemble one strip image across the specimen. In this example, the motorized stage is moving at a constant speed such that the real image of the specimen moves across the detector array with a constant velocity of 4 lines/second (the image moves across 4 lines of pixels in the array each second) in the direction of columns of pixels in the array, as shown in the diagram. Note that the velocity of 4 lines/second is chosen only as an example, both higher and lower speeds may commonly be used when scanning.

In FIG. 4a, the detector array is shown with 12 rows and 8 columns of pixels (12 Vertical×8 Horizontal pixels). In practice, much larger arrays are often used (some arrays may have 4000 columns and 3000 rows, for example).

When the entire array is used for imaging, geometric distortion makes it difficult to assemble the strip image, and a distortion correction is commonly performed on each frame image (i.e., using software) before assembling the frame images to produce image strips.

One technique to avoid the effect of geometric distortion without using a software geometric distortion correction when assembling an image strip is to define a small detector area of interest that has the width of the detector (all columns are included) but only includes a small number of rows near the center of the array (64 rows for example), and to assemble the image strip using, for this example, frames that are 4000 columns wide but only 64 rows high.

FIG. 4a shows a scan in which continuous red illumination is used, which results in all red pixels being detected by the monochrome array (as shown). An RGB image of the specimen can be acquired by scanning three times, once each with continuous red, green and blue illumination, where the three (R, G and B) image strips are combined into one RGB image strip. If white light illumination is used, a greyscale (monochrome) image results from each scan. This technique for assembling strip images by butting together sequential frame images is often called tiling.

FIG. 4b shows a timing diagram for controlling the shutter in the camera 305 in FIG. 3 (for example) when simple monochrome tiling like that shown in FIG. 4a is done. Light source 350 in FIG. 3 is turned on to illuminate the specimen continuously with a single color during scanning (for this example, the light source illuminates the specimen with red light). The control signals to accomplish this are shown at the bottom of FIG. 4b.

At the same time, the shutter in camera 305 is actuated, for example by the falling edge of the camera trigger signal at the top of FIG. 4b, with the shutter held open for a short period of time controlled by the Exposure Time control signal below the Camera Trigger control signal in the diagram.

This particular example matches the scan example shown in FIG. 4a, where each frame image includes 12 rows and 8 columns of detector pixels, and a new frame image is acquired every time the image of the specimen projected onto the detector array by the tube lens has moved a distance on the detector array equal to the distance between 12 lines of pixels in the array.

Turning now to FIG. 5a, this image on the other hand shows simple tiling using pulsed RGB light. In this example, the motorized stage is moving at a constant speed such that the real optical image of the specimen moves across the detector array with a constant velocity of 4 lines/second (the image moves across 4 lines of pixels in the array each second) in the direction of columns of pixels in the array, as shown in the diagram. Note that the velocity of 4 lines/second is chosen only as an example, both higher and lower speeds may commonly be used when scanning.

Notably, only one pass is needed to generate an RGB strip image. The illumination color cycles from red in frame 1, to green in frame 2, to blue in frame 3, back to red in frame 4, and so on. A ⅔ overlap between frames is very efficient (minimizes the required frame rate and illumination pulse rate). If you only look at one color at a time the capture scheme is the same as FIG. 4a; for example, red frames butt up together as in FIG. 4a (as do green and blue). In this figure the specimen is moved at the same velocity in the Y direction as in FIG. 4a (4 lines/s) which forces the camera to run at triple the frame rate compared to FIG. 4a.

In this example, the exposure time is set by the camera shutter, and is typically less than or equal to the time for the specimen to move a distance such that the image of the specimen projected onto the detector array moves a distance equal to 1/10 of the distance between adjacent pixel positions on the array.

Since the frame images of the three colors overlap, only one color has been measured in the first set of lines in the strip image (in this case corresponding to the top 1/3 of a frame), and data for the other two colors will have been acquired in the last 1/3 of a frame. The bold black arrow indicates the first row where all colors are available. In other words, a series of lines at the beginning of each image strip will be invalid (will not contain data for all 3 colors).

From a computer memory point of view each color can be accumulated separately. Frame 1 (red) goes into the 'red' memory, frame 2 into the 'green' memory, etc. Every third frame goes back into the same memory (e.g. frames 1, 4, 7, etc. go back into the 'red' memory).

The key advantage of a single pass scheme (FIG. 5a) vs. a three pass scheme (FIG. 4a) is that the effective scan speed is effectively tripled compared to combining three separate monochrome scans (the time required to capture an RGB image strip is 1/3 of that required to capture separate R, B and G image strips from separate scans) for a given fixed specimen/stage speed. Additionally a single pass scheme avoids the dead time needed to accelerate and decelerate on changing direction at the end of each strip, and the problem of combining and matching pixel information from three different scan strip images.

The single pass scheme shown in FIG. 5a (pulsed RGB illumination light with a monochrome camera) provides the same scan speed as a color camera (e.g. a monochrome sensor covered with a Bayer filter) using white illumination light (not shown), however the single pass scheme using pulsed illumination results in increased spatial resolution because demosaicing (which reduces spatial resolution) is required when using white light illumination and a monochrome sensor covered with a Bayer filter.

FIG. 5b shows the camera trigger pulses, the exposure time and the illumination on-time for each of the three illumination colors to generate overlapping single-color image frames in a single scan. As before, the camera shutter is triggered on the falling edge of the camera trigger signal, a maximum exposure time is typically less than or equal to the time for the specimen to move a distance such that the image of the specimen projected onto the detector array moves a distance equal to 1/10 of the distance between adjacent pixel positions on the array. In this example, the light source is on for the entire time that the camera shutter is open. However, it is also possible to leave the shutter open for a longer time and to use the illumination time to set the exposure time.

Turning now to FIG. 6, this image shows a more compact illustration of the information shown in FIG. 5a. In FIG. 5a each 8H×12V frame is represented by a rectangular image frame consisting of 12 rows of pixels in 8 columns.

In FIG. 6, the same data is represented in a more compact form where only one column is shown in each image frame, but this is meant to represent the 8 columns shown in FIG. 5a.

As before, the 8H×12V detector area is used for simple illustration only—commonly one can use sensors with 3000 rows and 4000 columns, for example, (and where geometric distortion correction of each image frame is commonly performed in software before assembling the image strips). A scan velocity of 4 lines/sec has been chosen for this example, but higher and lower scan velocities are may commonly be used.

Often only an active area of rows of pixels near the center of the sensor is used so that no geometric distortion correction is necessary (when using an active area of 128 rows× 4000 columns, for example, the frame rate of the detector array is higher than when the entire detector array is used, so that scan speed of the scanning instrument can be maintained even though a smaller number of lines of image pixel data are collected in each frame).

As before, during scanning there is typically specimen motion only in the same direction as the columns of pixels in the detector array; frame image data has been moved to the right in the diagram for illustration purposes only.

Combining Pulsed Illumination with Moving Specimen Image Averaging (MSIA):

FIG. 7 illustrates how 8H×12V image frames can be combined when using Moving Specimen Image Averaging (MSIA) in which each color at each image pixel position is measured twice and averaged. In this example, the scan speed is the same as that used in FIG. 6, and the exposure time for each frame is the same as before, but here the frame images are collected twice as often, and the illumination colors are changed twice as fast.

Note that each small square in a frame in this figure represents one entire row of pixels. Frame 1 represents the first frame of data collected with R illumination. Frame 2 represents the first frame with G illumination (with the frame moved to the right in the diagram for illustration, however the pixel data represented by Frame 2 lies directly on top of the data for Frame 1, just translated 2 rows in the scan direction).

Frame capture continues as the scan proceeds, but note that when the data for Frame 6 is acquired, all pixels in the last two rows of pixels of Frame 1 and the first two rows of Frame 6 have been exposed twice in R, twice in B, and twice in G.

Frame 6 is the first frame in the scan in which the first two lines have been exposed six times, resulting in the first two lines of MSIA data in the scanned image. These can be called the first two "valid" lines of data, since they are the first lines in the strip image that have been fully exposed (twice in R, twice in G, and twice in B).

When data from the first pixel of line 11 in Frame 1 is averaged with the data from the first pixel in line 5 of Frame 4, the result is an averaged value for R in the pixel at top left of the final strip image. The G value for that same pixel is the average of the pixel data exposed in G from the left pixel position in Frame 2, line 9 and Frame 5, line 3. The B value for that same pixel position comes from averaging the data from the left pixel position in Frame 3, line 7, and Frame 6, line 1.

As the scan continues, an image strip is stored in computer memory in which each image pixel contains R, G and B information, and each color value is the result of averaging two measurements. This results in pixels that have Signal/Noise increased by the square root of the number of measurements averaged (in this case the square root of 2, so the increase in S/N is a factor of 1.4). Generally, all of the measurements to acquire an RGB image strip are made in a single scan, and an image of the entire specimen can be assembled by butting together strips from a series of scans.

FIG. 8 illustrates how 8H×12V image frames can be combined when using Moving Specimen Image Averaging (MSIA) in which each color at each image pixel position is measured four times and averaged. In this example, the scan speed is the same as that used in FIG. 7, and the exposure time for each frame is the same as before, but here the frame images are collected twice as often, and the illumination colors are changed twice as fast. Note that each small square in a frame in this figure represents one entire row of pixels.

Frame 1 represents the first frame of data collected with R illumination. Frame 2 represents the first frame with G illumination (with the frame moved to the right in the diagram for illustration, however the pixel data represented by Frame 2 lies directly on top of the data for Frame 1, just translated 1 row in the scan direction). Frame capture continues as the scan proceeds, but note that when the data for Frame 12 is acquired, all pixels in the last rows of pixels of Frame 1 and the first row of Frame 12 have been exposed four times in R, four times in B, and four times in G. Frame 12 is the first frame in the scan in which the first line has been exposed 12 times, resulting in the first line of MSIA data in the scanned image.

We call this the first "valid" line of data, since this is the first line in the strip image that has been fully exposed (4 times in R, 4 times in G, and 4 times in B). The four R values are averaged, the four G values are averaged, and the four B values are averaged for each pixel in that line of data, resulting in the first line of RGB pixel values in the strip image.

As the scan continues, an image strip is stored in computer memory in which each image pixel contains R, G and B information, and each color value is the result of averaging four measurements. This results in pixels that have Signal/Noise increased by the square root of the number of measurements averaged (in this case the square root of 4, so the increase in S/N is a factor of 2). All of the measurements to acquire an RGB image strip are made in a single scan, and an image of the entire specimen can be assembled by butting together strips from a series of scans.

Commonly, we use an active area of 126 lines at the center of a 3000×4000 pixel sensor array, so each color at each pixel position in the resulting strip image can be exposed 126/3=42 times if the illumination color is changed and the shutter is triggered each time the specimen has moved a distance that causes the image of the specimen projected onto the sensor array to move a distance equal to the distance between lines of pixels in the array (resulting in a S/N increase of a factor of the square root of 42, or 6.5).

As a further example using an active area of 126 lines, if the illumination color is changed and the shutter is triggered each time the specimen has moved a distance that causes the image of the specimen projected onto the sensor array to move a distance equal to twice the distance between lines of pixels in the sensor array, each pixel in the resulting strip image will be illuminated 126/6=21 times, and the increase in S/N is a factor of the square root of 21, or 4.6.

Note—the active area that can be chosen for data acquisition in a particular sensor array may not match the number of lines required by the MSIA calculation. In this case, an active area that has more lines than necessary may be chosen, and data from rows of pixels at the top and bottom of the active area are commonly discarded to match the number of rows of data with the number required for the MSIA calculation.

In the example described immediately above, if the sensor array allows an active area of 128 lines to be chosen, one line of data at the top and one at the bottom of each acquired frame image can be discarded to match the 126-line requirement for the MSIA calculation described above. This is the "required frame image" as used below.

FIG. 9 shows the timing for the trigger signal for the camera shutter for monochrome tiling as described earlier in FIG. 4b, but here with the addition of MSIA. For monochrome tiling, the illumination is constant during acquisition of an image strip. As before, assume that the shutter is triggered on the falling edge of the camera trigger signal. At the top of FIG. 9, the shutter is triggered every time the image of the specimen projected onto the detector array has moved a distance equal to the number of lines in the required frame image (126 lines in the previous example). For MSIA=2, the camera shutter must be triggered twice as often (assuming the scan speed is unchanged), so that a new frame image is acquired when the projected image moves half way across the required frame image. For MSIA=4, the camera shutter must be triggered four times when the projected image move a distance equal to the number of lines in the required frame image, again assuming no change in the scan speed for the three examples shown in this diagram.

FIG. 10 shows several different examples of how the exposure for a frame image can be controlled. The top line in the diagram (line 1) shows the camera trigger signal. This signal triggers opening of the camera shutter (which may be electronic or mechanical), which here is shown to open on the falling edge of the signal. The second line illustrates that the time that the shutter remains open (commonly called the "exposure time" in an ordinary photography camera) can also be used to change the exposure of a frame image (an open shutter is represented by a high signal in this line). In most cases the illumination is turned on for all of the time the camera shutter is open, so the open shutter controls the exposure (as shown in the first two pulses in lines 2 and 3), resulting in the effective exposure times shown by the first two pulses in line 4.

However, this is not always the case. For example, when the third camera trigger signal in line 1 triggers the shutter to open, the illumination time has been set for a shorter time than the time the shutter is open, so in this case the effective exposure time (line 4) has been determined by the illumination time, not the time the shutter was open.

When the fourth camera trigger signal opens the camera shutter, this example shows that the camera shutter is opened before the illumination is turned on, but is closed before the illumination is turned off (i.e., there is an offset in the timing), resulting in the effective exposure time shown in line 4 which has been determined by a combination of the two events in lines 2 and 3.

FIG. 11 illustrates one of many possible examples showing how pulsed illumination using different colors of illumination can be used to acquire a multispectral strip image in a single scan using an instrument containing a monochrome (greyscale) detector array. In this example, which can be illustrated using the scanning microscope shown in FIG. 3, the light source 350 is controlled to produce four different colors, each frame image acquired in the strip image is comprised of eight lines of data, and the camera shutter is triggered 8 times in synchronism with the motion of the specimen in the time it takes for the image of specimen 100 to move a distance of 8 lines of pixels across detector array 304.

In this example, each image pixel position has been exposed twice for each of the four colors, the two measurements for each color are averaged together, and the final strip image is comprised of four colors for each pixel position, each of which has its SN increased by a factor of 1.4 because of averaging (this is an MSIA=2 image).

The microscope in FIG. 3 illustrates the use of transmitted light illumination through the specimen, however it is also possible to use epi-illumination where the specimen is illuminated from above (one example of epi-illumination is shown in FIG. 12). Note that one can add an arbitrary number of light colors, up to the number of rows available on the detector, and still acquire the full spectrum in a single pass.

FIG. 12 is a schematic view of a fluorescence or photoluminescence microscope slide scanner using a pulsed light source for epi-illumination that is synchronized with the motion of the scanning stage. A tissue specimen 1201 (or other specimen to be imaged) mounted on microscope slide 101 is illuminated from above by illumination source 1200 and beamsplitter 1210, where the color, intensity and on-time of the illumination source is controlled by computer 320 through connection 1205 (or other communication mechanism including Wi-Fi or Bluetooth).

In some cases, the tissue specimen 1201 may be a biological specimen, which is commonly stained with a fluorescent stain (including those containing quantum dots) and is commonly covered with a transparent cover slip (not shown). Light from the illumination source 1200 is reflected toward specimen 1201 by beamsplitter 1210 and passes through microscope objective 115 to illuminate the area of the specimen being frame imaged.

Fluorescent light emitted from the specimen is collected by infinity-corrected microscope objective 115 which is focused on the specimen by motorized positioner 120, passes through beamsplitter 1210 and fluorescence emission filter 1220. Fluorescence emission filter 1220 is chosen to pass the fluorescence wavelengths emitted by a fluorophore (and/or other source of fluorescence) in the specimen. The microscope objective 115 and tube lens 125 form a real image of the specimen on a monochrome area detector array 304, inside camera 305. An image of the specimen is collected by moving the microscope slide at constant speed using motorized stage 105 (controlled by computer 320) through connection 340 (or other communication mechanism including Wi-Fi or Bluetooth) in a direction perpendicular to the rows of detector pixels of the monochrome detector array 304 in camera 305.

The shutter in camera 305 (which may be part of detector array 304) is actuated by frame grabber 310 in synchronism with the position of the moving stage, which is controlled by computer 320 through connection 315 (or other communication mechanism). The shutter is open for only a short time for each exposure, for example for the time it takes for the image projected onto the detector array by tube lens 125 to move a distance across the detector array that is less than or equal to half the distance between adjacent rows in the array.

Computer 320 combines a sequence of contiguous frame images from the array to construct an image of one strip across the specimen. When the instrument is configured for MSIA imaging, each image pixel position is imaged more than once, and the pixel data is averaged (or added, for weak fluorophores). Strips are then assembled to form a complete fluorescence image of the specimen.

When there is more than one fluorophore in the specimen, multiple fluorophores can be imaged in a single scan by changing the color of the illumination from light source 1200 (setting the excitation wavelength for a particular fluorophore) and changing emission filter 1220 (setting the emission wavelength for that fluorophore); both changes can be made at the same time and synchronized with the scan. In some cases, a single beam splitter and emission filter combination may be used with multiple excitation wavelengths, enabling the imaging system to acquire multiple fluorophores merely by changing the color of the excitation source only. When the instrument is configured for MSIA imaging, each image pixel position for each fluorophore is imaged more than once, and the pixel data for each fluorophore is averaged (or added, for weak fluorophores).

When the instrument shown in FIG. 12 is used for photoluminescence imaging, light source 1200 may be set at a constant wavelength that excites photoluminescence in the specimen, and emission filter 1220 may be replaced with a tunable narrow-band transmission filter or a set of filters with narrow spectral bands over a continuous spectral range. Computer 320 then controls the tunable narrow-band transmission filter, or the automatic changing of a set of optical filters, in sequence with the motion of the specimen and activation of the shutter in camera 305. As before, detector array 304 is a monochrome (greyscale) detector array. When configured for MSIA imaging, each image pixel position is imaged more than once, and pixel data for all transmission filter spectral bands is averaged (or added).

The invention claimed is:

1. An instrument for scanning a specimen, comprising:
   a. a scanning stage for supporting the specimen;
   b. a detector having a plurality of pixels, the scanning stage and the detector movable relative to each other to move the specimen in a scan direction at a constant scan speed during a scan;
   c. a pulsed illumination source synchronized with the motion of the specimen on the scanning stage; and
   d. a processor operable to perform Moving Specimen Image Averaging (MSIA) on image data to generate an image of the specimen;
   e. wherein at least some of the pixels of the detector are operable to collect light emitted from or reflected by the specimen during the scan due to the pulsed illumination source; and
   f. wherein a color of the pulsed illumination source is changed each time the specimen has moved a distance that causes the image of the specimen projected onto the detector to move, at a constant image speed with respect to the detector, a distance equal to the distance between lines of pixels in the detector.

2. The instrument of claim 1, wherein the detector is a monochrome detector.

3. The instrument of claim 1, where the pulsed illumination source provides illumination of one or more colors.

4. The instrument of claim 1, where the pulsed illumination source provides sequential R, G and B illumination.

5. The instrument of claim 1, wherein the pulsed illumination source is configured for brightfield imaging.

6. The instrument of claim 1, wherein the pulsed illumination source is configured for fluorescence imaging.

7. The instrument of claim 1, wherein the detector is a color area detector.

8. The instrument of claim 7, wherein the color area detector array incorporates a filter array.

9. The instrument of claim 8, wherein the colors in the filter array are chosen to transmit spectrally-resolved light such that a final image is a spectrally-resolved or multispectral image of the specimen.

10. The instrument of claim 8, wherein the filter array includes one or more of an RGGB Bayer filter, a mosaic scan filter array, or a scan color filter array.

11. The instrument of claim 7, wherein the color area detector array incorporates one of a mosaic scan filter array or a scan color filter array, and the colors in the filter array are chosen to transmit spectrally-resolved light such that a final image is a spectrally-resolved or multispectral image of the specimen.

12. The instrument of claim 1, where the pulsed illumination source provides pulsed white-light.

13. The instrument of claim 1, wherein an exposure time for each image frame is set using a camera's internal or external shutter.

14. The instrument of claim 1, wherein an exposure time for each image frame is set by a pulse width of the pulsed illuminating source.

15. The instrument of claim 1, wherein the instrument scans the specimen in one of brightfield and fluorescence.

16. The instrument of claim 1, wherein the specimen is illuminated from below by a light source.

17. The instrument of claim 1, wherein the specimen is illuminated from above by a light source.

18. The instrument of claim 1, wherein the detector comprises a plurality of active areas of pixels, each active area acting as a separate MSIA detector.

19. The instrument of claim 1, where the pulsed illumination source provides illumination in three or more colors.

20. The instrument of claim 1, where the pulsed illumination source provides illumination in four or more colors.

21. The instrument of claim 1, where distortion is corrected on an active area of rows of pixels of the detector.

22. The instrument of claim 18, wherein the active areas are near the centre of the detector.

23. The instrument of claim 1, wherein a valid line of image data is defined as having been exposed at least twice for each color emitted by the pulsed illumination source.

24. The instrument of claim 1, wherein a valid line of image data is defined as having been exposed at least four times for each color emitted by the pulsed illumination source.

25. The instrument of claim 1, wherein MSIA occurs with a region of interest greater than 2 lines.

26. The instrument of claim 1, wherein MSIA occurs with a region of interest greater than n lines.

* * * * *